Sept. 12, 1967     P. R. SIDBECK     3,341,686
ELECTRICAL WELDING ARC GAP CONTROL METHOD AND MEANS
Filed Dec. 9, 1966
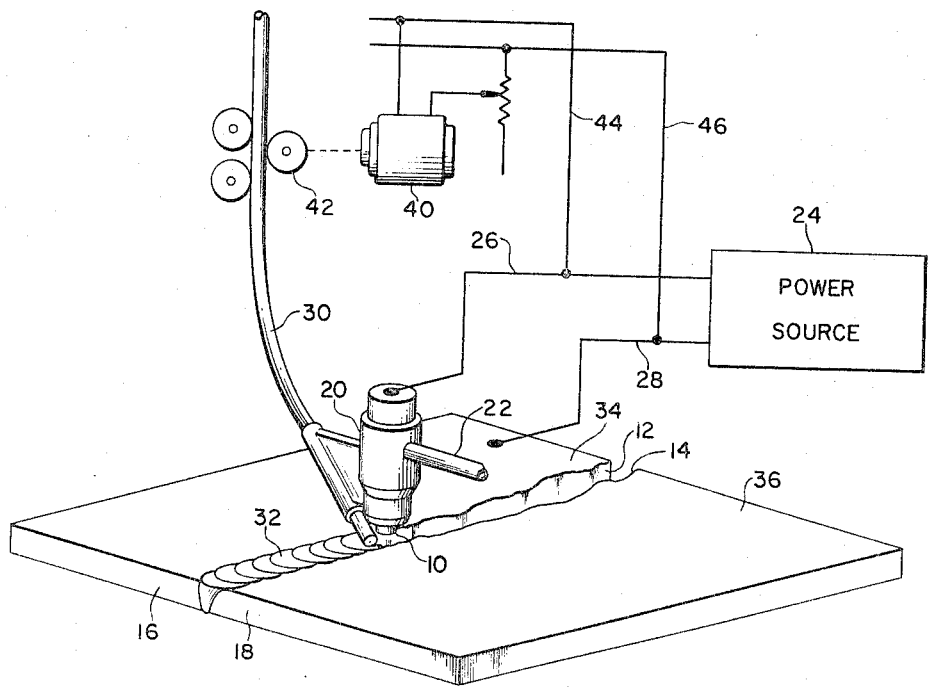
FIG. 1
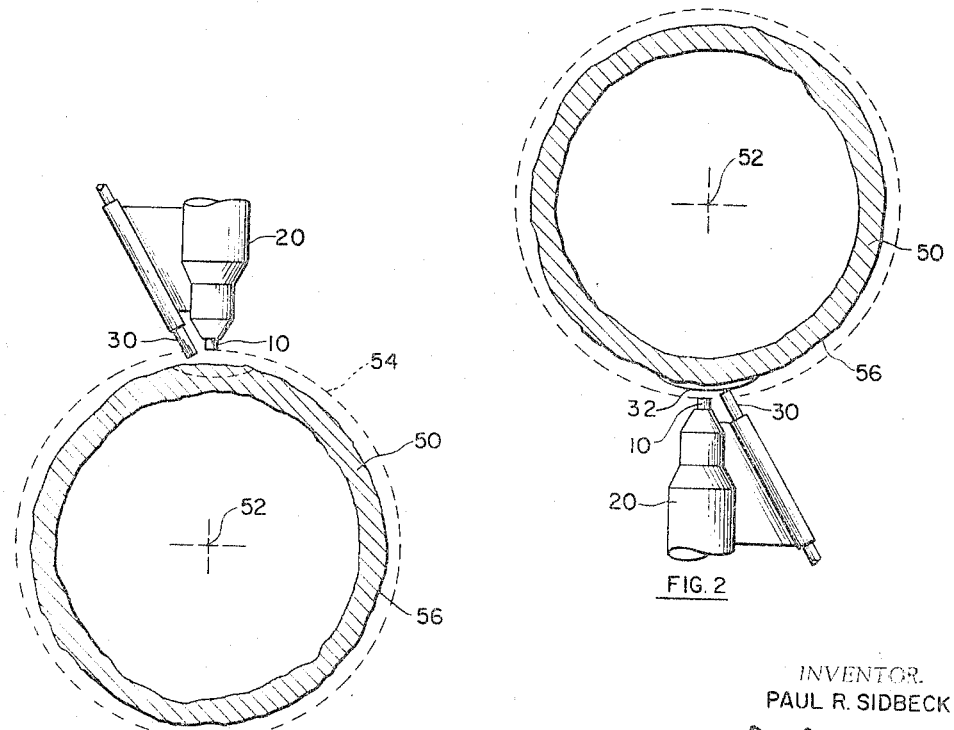
FIG. 2
FIG. 3
INVENTOR.
PAUL R. SIDBECK
ATTORNEY United States Patent Office 3,341,686
Patented Sept. 12, 1967

3,341,686
ELECTRICAL WELDING ARC GAP CONTROL
METHOD AND MEANS
Paul R. Sidbeck, Torrance, Calif., assignor to
North American Aviation, Inc.
Filed Dec. 9, 1966, Ser. No. 600,589
5 Claims. (Cl. 219—130)

ABSTRACT OF THE DISCLOSURE

The disclosure is of a method for adding welding rod or filler metal wire into a molten weld puddle at a variable rate by varying the speed of a drive motor which functions to move the welding wire during progressive electric fusion arc welding. The mentioned motor is connected in the welding power circuit so that voltage applied to the welding wire feed motor will vary with changes in arc voltage. Thus, a decrease in arc gap distance caused by excessive weld metal build-up will lower the arcing voltage and result in slower rate of welding wire feed which lessens the amount of weld metal build-up. Conversely, if the weld puddle surface moves away from the electrode beyond a predetermined distance, the resulting increase of arc voltage is reflected in a momentary increase in welding wire feed rate, which increases the puddle mass and restores the surface thereof closer to the electrode.

---

This invention concerns method and means for controlling, primarily, weld metal build-up and, secondarily, arcing distance between an electrode and a molten weld puddle, particularly but not exclusively during changes of weld puddle surface location due to gravity effects during vertical and inverted welding operations.

Summary of invention

The inventive concept in this case may be used in progressive fusion electrical arc welding either in a relatively straight path as required to join two flat plates, or in a circumferential path as required to join the abutting ends of two tubular conduit sections. In the latter context, the electrode may be rotated about the relatively stationary tubular workpiece components in a circular path having a center coinciding with the longitudinal axis of the conduit sections and a substantially constant radius with respect to such center. Changes in arc gap distance resulting from weld puddle sag under gravity or from non-uniformity of the workpiece outer surface contour result in variations of arcing voltage which, in the absence of compensating measures, vary the mass and the liquid level of the weld puddle continuously as the electrode rotates around the workpiece components. The stated changes of puddle mass or level, depending upon their nature, result in a weld seam having different depths of penetration and localized portions which either protrude or sag above or below the adjacent unfused surface of the base metal, respectively, along the length of the seam. To eliminate such non-uniformity of weld seam depth and surface contour, the wire feed motor is connected to the welding power circuit so that filler metal rod or wire is withdrawn from the puddle when necessary to avoid an increase of weld puddle mass, and conversely is added at an increasing rate into the weld puddle to compensate for a decrease of weld puddle mass. In contrast to the above, one of the best known conventional welding techniques for controlling weld seam quality in the prior art involves movement of the electrode away from or closer to the puddle surface as required to maintain the weld gap and arc voltage constant, while continuously adding weld metal at a substantially constant rate.

Description of drawings

FIGURE 1 shows a general perspective view of an electrode and wire holder during a welding operation according to the concept disclosed herein, with mechanical end electrical connections shown schematically, FIGURE 2 shows the electrode from FIGURE 1 at an intermediate stage during welding of a different type of workpiece than that of FIGURE 1, and FIGURE 3 shows a view corresponding with FIGURE 2 but with the electrode in a different stage of the same welding process.

Detailed description

This invention concerns a technique for progressive fusion welding on workpieces along a predetermined welding path to join together two or more workpiece components. Thus, referring to FIGURE 1, electrode 10 is operatively related for welding along a predetermined path generally defined by the confronting edges 12 and 14 of two metallic plates or sheets 16 and 18, respectively. Electrode 10 may comprise a non-consumable tungsten electrode contained within a gas cup 20 adapted to receive an inert gas flow through a conduit 22 connected to a source (not shown) for shielding electrode 10 from surrounding atmosphere in a manner familiar to the prior art. Electrode 10 is connected to a suitable source of welding power 24 with the workpiece in circuit as shown schematically by electrical connections 26 and 28. During sustained linear movement of electrode 10 by suitable well-known and preferably automatic support means (not shown), filler metal in the form of welding rod or wire 30 is substantially continuously fed into the weld puddle, but at a varying rate as discussed more particaulrly below. The voltage from source 24 is sufficient to cause an electrical arc between electrode 10 and one or both workpiece components 16 and 18, whereby a weld seam is progressively formed by weld puddle 32 which is liquid or semi-liquid at the location of the welding arc during the welding operation and thereafter solidifies. The distance between the lower distal end or tip of electrode 10 and the surface of puddle 32 is variously termed the arcing distance, the weld gap or the electrode clearance as understood by those skilled in the art.

Due to roughness or other non-uniformity in the contour of edges 12 and 14, the stated edges are not in uniform mutual contact throughout their length, whereby the amount of base metal involved in the weld puddle at each location may vary over a wide range as the electrode traverses the welding path. The foregoing variation results in corresponding changes of puddle mass whereby the surface level of puddle 32 is lowest at those locations corresponding to widest distance between edges 12 and 14 and is highest when edges 12 and 14 are in actual contact along their length. In the absence of compensating measures, the surface of weld seam 32 at the completion of welding would normally be characterized by a wavy contour whereby the seam protrudes above the unfused adjacent base metal in substantially planar surfaces 34 and 36 of workpiece components 16 and 18, respectively, at some portions or sags below the plane defined by surfaces 34 and 36 at other portions of its total length.

To avoid the mentioned non-uniformity of weld seam surface contour with respect to that of the adjacent parent metal, as well as non-uniformity in depth of penetration, the present invention contemplates means for varying the rate of feed of welding wire or rod 30 by use of a variable speed drive motor 40 appropriately connected to driving wheels or gears 42 and adapted to move wire 30 into the weld puddle at a location substantially aligned under electrode 10 or closely proximate thereto. As suggested by the schematic showing of FIGURE 1, motor 40 is connected by leads 44 and 46 to lines 26 and 28, respectively, whereby changes in the arc voltage across the welding gap result in changes of feed rate due to variation in the speed of motor 40. Thus, when the surface of puddle 32 sags below the plane defined by surfaces 34 and 36, the resulting increase of arc voltage causes an increase in speed of motor 40 whereby wire 30 is fed at a correspondingly faster rate into weld puddle 32. The stated increase in wire feed rate accelerates the weld metal build-up in puddle 32 to increase the mass thereof and thus maintain the surface of puddle 32 substantially constant and coinciding essentially with surfaces 34 and 36. Alternatively, when the surface of puddle 32 momentarily moves closer to the tip of electrode 10 due to excessive weld metal build-up, the resulting decrease of arc gap voltage is reflected in a slackening of speed in motor 40 and consequently less filler metal from wire 30 being added into the puddle.

Referring to FIGURES 2 and 3, application of the inventive concept discussed in connection with FIGURE 1 to the problem of welding non-planar workpieces along non-linear seams is illustratively shown in connection with welding on tubular metallic conduit 50 having a longitudinal axis 52 therethrough. Electrode 10 is adapted to rotate about tube 50 and apply heat along a circumferential path wherein the tip of electrode 10 during movement thereof describes an arc defined by broken line 54. When electrode 10 is situated as shown in FIGURE 2 with respect to tube 50 during the welding operation, gravity effects on weld puddle 32 causes the molten metal therein to sag downwardly as shown. The foregoing effect results in substantial lessening of the arcing distance between electrode 10 and the puddle surface, which would normally cause electrode 10 to be moved farther away from the workpiece if electrode 10 were mounted according to methods known in the prior art for maintaining a constant arc gap. However, the mentioned prior art method would obviously not compensate or correct for the protrusion of weld seam 32 radially beyond the outer surface 56 of tube 50 after completion of the welding operation. However, sagging of puddle 32 as suggested in FIGURE 2 would result in a decrease of arcing voltage which would lessen the speed of motor 40 thus resulting in slowing or stopping of the addition of wire 30 into puddle 32 using the concept discussed in connection with FIGURE 1. Since correction of the condition begins early when puddle 32 starts to sag, the concept in this case compensates by retarding wire feed rate to prevent the amount of puddle sag exaggerated for the sake of clarity in FIGURES 2 and 3.

Conversely, referring to FIGURE 3, the sagging of puddle 32 due to gravity effects with electrode 10 situated above workpiece 50 would increase the arcing distance and hence the arcing voltage and this would cause an increase in the rate at which wire 30 is fed into the puddle. From the foregoing discussion, it may be seen that the welding technique disclosed herein involves mounting of electrode 10 in substantially fixed relationship to workpiece components 16, 18 or 50 throughout its path of movement. As applied to FIGURES 2 and 3, for example, broken line 54 has a constant radius around center 52, although the arcing distance between workpiece 50 and electrode 10 will vary somewhat due to roughness or non-circularity of surface 56 as well as due to the gravity effects on puddle 32 discussed hereinabove. However, in spite of the mentioned tendency for changes in arc distance and corresponding changes or arc voltage, the amount of weld metal build-up in the circumferential seam 32 progressively formed around tubular workpiece 50 is maintained substantially constant, and the resulting seam has a relatively smooth surface substantially coinciding with the adjacent base metal comprising workpiece 50 throughout the entire circumference.

The method and means thus described hereinabove have been found consistently successful in achieving weld nuggets and seams having substantial uniformity in width, depth and cross-sectional shape where welding is done either from above or below the surface sought to be welded, as well as during vertical welds where workpiece mass and heat dissipation characteristics of workpiece materials require relatively large weld puddles or several passes of electrode 10 successively along the same path to complete the joint.

While the particular details set forth above and in the drawings are fully capable of providing the advantages herein stated, the structure and method thus disclosed are merely illustrative and could be modified or varied to produce the same results without departing from the scope of the inventive concept as defined in the appended claims.

I claim:
1. A method of controlling amount of weld metal build-up in a weld puddle during progressive fusion arc welding, said method comprising:
   permitting minor variations of arc voltage due to non-uniformity in workpiece surface contour or puddle surface level at the location of the weld, and
   varying the feed rate of filler metal added to said weld puddle in response to said variations in arc voltage.

2. A method of maintaining a substantially constant weld puddle mass in a progressive fusion arc welded seam, comprising the steps of:
   maintaining a substantially uniform path of movement of an electrode relative to a stationary workpiece, and
   simultaneously maintaining the tempertaure of said weld puddle substantially constant by varying the rate at which filler metal is added to said puddle in response to variations in the level of said weld puddle in relation to the adjoining unfused surface of said workpiece.

3. In a method for progressively fusion welding on an arcuate surface by moving an electrode in a smooth circular path relative to said surface, the steps of:
   using variations in the arc voltage of said electrode to sense variations in the puddle surface proximate to said electrode, and
   using said sensed voltage variations to vary the rate at which filler metal is added to said puddle.

4. Apparatus for controlling the amount of weld metal build-up in a weld puddle during progressive fusion arc welding, said apparatus comprising:
   means for moving an electrode relative to said puddle,
   means for adding filler metal to said puddle at a varying rate, and
   means to vary said rate in response to changes of arc voltage between said puddle and said electrode.

5. The apparatus set forth in claim 4 above, wherein: said means for moving said electrode rotates said electrode about a stationary tubular workpiece having a longitudinal axis therethrough and said electrode rotation is in a circular path of substantially constant radius, the center of said path lying on said axis.

References Cited
UNITED STATES PATENTS

| | | | |
|---|---|---|---|
| 1,508,738 | 9/1924 | Whiting | 219—124 |
| 2,013,630 | 9/1935 | Goldsborough | 219—60.1 |
| 2,360,160 | 10/1944 | Pickhaver | 219—130 |
| 2,710,902 | 6/1955 | Pilia | 219—74 |

RICHARD M. WOOD, *Primary Examiner.*